(12) United States Patent
Beal et al.

(10) Patent No.: US 9,120,115 B2
(45) Date of Patent: Sep. 1, 2015

(54) DISPENSING SYSTEMS AND METHODS FOR MONITORING ACTUATION SIGNALS FOR DIAGNOSTICS

(71) Applicant: Nordson Corporation, Westlake, OH (US)

(72) Inventors: James R. Beal, Woodstock, GA (US); Peter W. Estelle, Norcross, GA (US); Howard B. Evans, III, Sugar Hill, GA (US); Scott B. Means, Lawrenceville, GA (US); Raymond J. Slattery, III, Akron, OH (US)

(73) Assignee: NORDSON CORPORATION, Westlake, OH (US)

( * ) Notice: Subject to any disclaimer, the term of this patent is extended or adjusted under 35 U.S.C. 154(b) by 67 days.

(21) Appl. No.: 13/799,694

(22) Filed: Mar. 13, 2013

(65) Prior Publication Data

US 2014/0117050 A1    May 1, 2014

Related U.S. Application Data

(60) Provisional application No. 61/718,300, filed on Oct. 25, 2012.

(51) Int. Cl.
*B05C 11/10* (2006.01)
*B05C 5/02* (2006.01)
*B05B 9/01* (2006.01)

(52) U.S. Cl.
CPC .............. *B05C 11/1002* (2013.01); *B05C 5/02* (2013.01); *B05B 9/01* (2013.01)

(58) Field of Classification Search
CPC ............ B05B 9/00; B05B 9/01; B05B 12/00; B05B 12/02

USPC ................................ 222/23, 30, 52, 54, 146.5
See application file for complete search history.

(56) References Cited

U.S. PATENT DOCUMENTS 2,672,215 A    3/1954    Schmid
2,744,792 A    5/1956    Finn
(Continued)

FOREIGN PATENT DOCUMENTS

CN    202116049 U    1/2012
DE    3815089 A1    11/1989
(Continued)

OTHER PUBLICATIONS

European Patent Office, European Search Report in corresponding European Patent Application No. 13184144.7 dated Mar. 25, 2014 (6 pages).

(Continued)

*Primary Examiner* — Paul R Durand
*Assistant Examiner* — Vishal Pancholi
(74) *Attorney, Agent, or Firm* — Wood, Herron & Evans, L.L.P.

(57) ABSTRACT

A dispensing system includes a hot melt unit delivering heated adhesive through a hose to at least one dispenser gun, which is actuated by an outside source of gun actuation. Rather than directly connecting the source of gun actuation to the dispenser gun, the source of gun actuation is connected to the hot melt unit and then to the dispenser gun. For example, the gun actuation signals may be terminated at a terminal block in the hot melt unit, which enables the hot melt unit to monitor the gun actuation signals. The dispensing system is operable to perform various diagnostics pertaining to the dispenser gun and the system as a whole based on these monitored gun actuation signals.

40 Claims, 3 Drawing Sheets

(56) References Cited

U.S. PATENT DOCUMENTS

| | | | |
|---|---|---|---|
| 2,824,335 A | 2/1958 | Moffatt | |
| 3,030,153 A | 4/1962 | Krenke et al. | |
| 3,219,394 A | 11/1965 | Moss | |
| 3,580,644 A | 5/1971 | Ballard | |
| 3,756,456 A | 9/1973 | Georgi | |
| 3,773,069 A | 11/1973 | Rebentisch | |
| 3,981,416 A | 9/1976 | Scholl | |
| 4,084,628 A | 4/1978 | Schmid | |
| 4,086,466 A | 4/1978 | Scharlack | |
| 4,417,675 A | 11/1983 | Abt et al. | |
| 4,437,581 A | 3/1984 | Coker | |
| 4,441,450 A | 4/1984 | Dettelbach et al. | |
| 4,474,311 A | 10/1984 | Petrecca | |
| 4,479,600 A | 10/1984 | Albright | |
| 4,482,367 A | 11/1984 | Howeth | |
| 4,583,885 A | 4/1986 | Thiele | |
| 4,613,059 A * | 9/1986 | Merkel | 222/52 |
| 4,821,922 A | 4/1989 | Miller et al. | |
| 4,850,425 A | 7/1989 | Anderson | |
| 4,898,527 A | 2/1990 | Claassen | |
| 4,994,984 A | 2/1991 | Massimo | |
| 5,006,018 A | 4/1991 | Depew | |
| 5,174,472 A | 12/1992 | Raque et al. | |
| 5,294,218 A | 3/1994 | Fiorentini et al. | |
| 5,332,366 A | 7/1994 | Anderson | |
| 5,589,203 A | 12/1996 | Sato | |
| 5,680,961 A | 10/1997 | Boccagno et al. | |
| 5,715,972 A | 2/1998 | Siddiqui | |
| 5,791,830 A | 8/1998 | Fort et al. | |
| 5,909,829 A | 6/1999 | Wegman et al. | |
| 6,039,513 A | 3/2000 | Law | |
| 6,095,803 A | 8/2000 | Slater | |
| 6,175,101 B1 | 1/2001 | Miller et al. | |
| 6,230,936 B1 | 5/2001 | Lasko | |
| 6,318,599 B2 * | 11/2001 | Estelle et al. | 222/146.5 |
| 6,352,173 B1 | 3/2002 | Duckworth | |
| 6,380,861 B2 * | 4/2002 | Estelle et al. | 340/588 |
| 6,471,751 B1 | 10/2002 | Semanderes et al. | |
| 6,616,721 B2 | 9/2003 | Oh | |
| 7,263,781 B2 | 9/2007 | Sielemann | |
| 7,626,143 B2 | 12/2009 | Miller | |
| 8,157,483 B2 | 4/2012 | Volkmann | |
| 8,201,717 B2 | 6/2012 | Varga et al. | |
| 8,383,991 B2 | 2/2013 | Ganzer et al. | |
| 8,430,230 B1 | 4/2013 | Ferguson et al. | |
| 8,580,006 B2 | 11/2013 | LaCroix et al. | |
| 2001/0023880 A1 * | 9/2001 | Estelle et al. | 222/504 |
| 2002/0079325 A1 * | 6/2002 | Estelle | 222/1 |
| 2003/0021700 A1 | 1/2003 | Serafin et al. | |
| 2003/0080154 A1 | 5/2003 | Jeter | |
| 2003/0080156 A1 | 5/2003 | Jeter et al. | |
| 2004/0055739 A1 * | 3/2004 | Suckow et al. | 165/104.33 |
| 2004/0167738 A1 | 8/2004 | Miller | |
| 2005/0274740 A1 | 12/2005 | Duckworth et al. | |
| 2006/0055503 A1 | 3/2006 | Tanida | |
| 2006/0159565 A1 | 7/2006 | Sanwald | |
| 2006/0289560 A1 * | 12/2006 | Bourget et al. | 222/54 |
| 2007/0080157 A1 | 4/2007 | Mehaffy et al. | |
| 2008/0145248 A1 | 6/2008 | Kato et al. | |
| 2008/0196512 A1 | 8/2008 | Miller | |
| 2008/0199323 A1 | 8/2008 | Bauck et al. | |
| 2008/0206066 A1 | 8/2008 | Nguyen et al. | |
| 2008/0302477 A1 | 12/2008 | Varga et al. | |
| 2009/0285983 A1 | 11/2009 | Baldauf et al. | |
| 2010/0282088 A1 | 11/2010 | Deuber et al. | |
| 2011/0002793 A1 | 1/2011 | Bauck et al. | |
| 2011/0042408 A1 | 2/2011 | Giordano et al. | |
| 2012/0051945 A1 | 3/2012 | Orndorff et al. | |
| 2012/0223094 A1 * | 9/2012 | Rickard et al. | 222/1 |
| 2012/0247665 A1 | 10/2012 | Varga et al. | |
| 2012/0273071 A1 | 11/2012 | Kai | |
| 2013/0105003 A1 | 5/2013 | Quam et al. | |
| 2013/0105004 A1 | 5/2013 | Tix et al. | |
| 2013/0105005 A1 | 5/2013 | Tix et al. | |
| 2013/0105039 A1 | 5/2013 | Tix et al. | |
| 2013/0105517 A1 | 5/2013 | Tix et al. | |
| 2013/0105526 A1 | 5/2013 | Ross et al. | |
| 2013/0112279 A1 | 5/2013 | Ross et al. | |
| 2013/0112280 A1 | 5/2013 | Quam et al. | |
| 2013/0112294 A1 | 5/2013 | Ross et al. | |
| 2013/0112312 A1 | 5/2013 | Ross et al. | |
| 2013/0112709 A1 | 5/2013 | Ross et al. | |
| 2013/0112710 A1 | 5/2013 | Ross et al. | |
| 2013/0112711 A1 | 5/2013 | Lind et al. | |
| 2013/0115016 A1 | 5/2013 | Ross et al. | |

FOREIGN PATENT DOCUMENTS

| | | |
|---|---|---|
| DE | 19923410 A1 | 11/1999 |
| DE | 10156691 A1 | 5/2003 |
| EP | 0072679 A1 | 2/1983 |
| EP | 1350743 B1 | 6/2006 |
| EP | 2119509 A2 | 11/2009 |
| FR | 1366936 A | 7/1964 |
| FR | 2787770 A1 | 6/2000 |
| GB | 1562562 A | 3/1980 |
| GB | 2485041 A | 5/2012 |
| WO | 9814314 A1 | 4/1998 |
| WO | 2007084891 A2 | 7/2007 |
| WO | 2009046545 A1 | 4/2009 |
| WO | 2012095838 A1 | 7/2012 |

OTHER PUBLICATIONS

European Patent Office, Extended European Search Report in corresponding European Patent Application No. 13187639.3, dated Feb. 28, 2014 (5 pages).
Fluid-Air Products Inc., InvisiPac, Jan. 5, 2013.
Meltex Corporation; Product Information Sheet; Hot Melt Applicator MP 400; 1 page.
Meltex GmbH; Product Information Sheet; Hot Melt Applicator MX 2001; 2 pages.
Meltex GmbH; Product Information Sheet; Hot Melt Applicator MX 2003; 2 pages.
European Patent Office, Extended European Search Report in EP Patent Application No. 13185184, Jun. 6, 2014 (7 pages).
United States Patent and Trademark Office, Non-Final Office Action issued in corresponding U.S. Appl. No. 13/799,788 (Jun. 12, 2014) (24 pages).
U.S. Patent and Trademark Office, Office Action in U.S. Appl. No. 13/799,788, Feb. 3, 2015 (16 pages).
U.S. Patent and Trademark Office, Office Action in U.S. Appl. No. 13/799,737, Feb. 10, 2015 (15 pages).
U.S. Patent and Trademark Office, Notice of Allowance in U.S. Appl. No. 13/659,291, Feb. 27, 2015 (5 pages).
European Patent Office, Extended European Search Report in EP Patent Application No. 13185893.8, Apr. 1, 2015 (6 pages).
United States Patent and Trademark Office, Non-Final Office Action issued in corresponding U.S. Appl. No. 13/494,124 (Apr. 2, 2015) (30 pages).
United States Patent and Trademark Office, Non-Final Office Action issued in corresponding U.S. Appl. No. 13/799,656 (Apr. 10, 2015) (42 pages).

* cited by examiner

DISPENSING SYSTEMS AND METHODS FOR MONITORING ACTUATION SIGNALS FOR DIAGNOSTICS

CROSS-REFERENCE TO RELATED APPLICATION

This application claims the benefit of U.S. Provisional Patent Application Ser. No. 61/718,300, filed on Oct. 25, 2012 (pending), the disclosure of which is incorporated by reference herein in its entirety.

FIELD OF THE INVENTION

The present invention generally relates to an adhesive dispensing system and more particularly, to components of the system which are configured to control and monitor the operation of the adhesive dispensing system.

BACKGROUND

A conventional dispensing system for applying hot melt adhesive generally includes a supply of adhesive material, a hot melt unit or melter that liquefies and heats the adhesive material to a desired application temperature, and at least one dispenser module or gun that selectively dispenses the heated adhesive onto a substrate. Furthermore, conventional dispensing systems generally include one or more controllers (e.g., a processor and a memory) and input controls electrically connected to the controller(s) to provide a user interface with the dispensing system. The controller(s) are in communication with the components of the dispensing system, such that the controller(s) control various aspects of the operation of the dispensing system. For example, the controller(s) may provide actuation signals to operate a solenoid valve in the gun, signals to adjust settings of the hot melt unit, and signals to prompt the delivery of more adhesive material from the adhesive supply to the hot melt unit.

In one particular type of conventional dispensing system, one of the controllers is a source of gun actuation, which may be a programmable logic controller, for example. This source of gun actuation is directly connected to the dispenser gun using a cable running between these components. In a similar manner, the hot melt unit is directly connected to the dispenser gun via a (typically heated) hose that is configured to supply molten adhesive to the dispenser gun following heating and melting at the hot melt unit. The hot melt unit includes a melter control system that is operable to monitor and control the elements within the hot melt unit. The melter control system of this conventional dispensing system does not communicate with or control the source of gun actuation.

As a result, multiple elements (e.g., cables and hoses) extend from the dispenser gun and create what may be considered an "unsightly" set of connections between the components of the dispensing system. In addition, these multiple separate cables and hoses effectively increase the size of a "gun envelope" defined by the space required for the dispenser gun and all wiring paths of hoses, cables, or other connectors that extend to other components directly connected to the dispenser gun. Especially in applications where the dispenser gun is mounted for movement with respect to a substrate, this larger gun envelope causes the cable(s) to encounter a higher risk of being accidentally interfered with or disconnected by adjacent personnel or equipment. Moreover, the melter control system operates effectively blindly with respect to the actuation signals being provided to the dispenser gun. In this regard, the melter control system can perform diagnostics and monitoring of components of the hot melt unit, but the melter control system does not receive signals that would enable similar diagnostics and monitoring of the components within the dispenser gun. This lack of "visibility" of the actuation signals for the dispenser gun makes it difficult to provide relevant diagnostic information on the entire dispensing system at a single user interface.

For reasons such as these, an improved dispensing system and method that enables more comprehensive diagnostics would be desirable.

SUMMARY OF THE INVENTION

According to one embodiment of the invention, an adhesive dispensing system includes a dispenser gun configured to dispense adhesive onto a substrate. The dispensing system also includes a hot melt unit configured to heat adhesive and pump adhesive to the dispenser gun. The hot melt unit includes a melter control system that controls operation of the hot melt unit. The dispensing system also includes a source of gun actuation, which is configured to send gun actuation signals to operate the dispenser gun. The gun actuation signals are sent to the melter control system and then to the dispenser gun such that the melter control system monitors the gun actuation signals. To this end, the control signals for each of the components of the adhesive dispensing system are made available at a single controller, specifically the melter control system.

In one aspect, the melter control system is configured to operate a plurality of diagnostic processes based on the monitored gun actuation signals. These diagnostic processes enable monitoring of the dispenser gun and monitoring of operation of the dispensing system as a whole. The plurality of diagnostic processes includes monitoring life cycles of components of the dispenser gun, enabling a standby state during long periods without gun actuation, and adjusting fluid pressure delivered by the hot melt unit based on the line speed at the gun. The plurality of diagnostic processes also includes comparing actuation parameters of the hot melt unit and the dispenser gun to identify error states, and shifting a reversal of a piston pump to avoid pump wink at the dispenser gun. Additional diagnostic processes may also be enabled as a result of having access to control signals for all components at the hot melt unit.

The dispensing system may also include a hose connected to the hot melt unit and the dispenser gun. The hose delivers heated adhesive from the hot melt unit to the dispenser gun. The dispensing system also includes a cable connected to the hot melt unit and the dispenser gun for delivering the gun actuation signals to the dispenser gun. The cable is positioned alongside or is coupled to the hose such that a gun envelope defined by the dispenser gun and wire connections to other components is minimized. This reduction in the gun envelope reduces the size of the system in typically crowded machine spaces where space is at a premium. In some embodiments, the cable is positioned within the hose. The source of gun actuation may be positioned within the hot melt unit or outside of the hot melt unit.

In another aspect, the dispensing system further includes a connecting device in the form of a terminal block located in the hot melt unit. The source of gun actuation is connected to the terminal block and the terminal block is connected to the dispenser gun such that the gun actuation signals are terminated within the hot melt unit. The melter control system monitors the gun actuation signals at the terminal block. The melter control system may operate to selectively control the gun actuation signals by determining whether gun actuation signals are passed through the terminal block to the dispenser gun. For example, error states in which the dispenser gun should not be actuated (e.g., such as for safety reasons) can be avoided. The dispensing system may also include an inline signal control device connected to the terminal block. The inline signal control device is configured to control or modify the gun actuation signals passed through the terminal block.

In another embodiment according to the invention, a method of operating an adhesive dispensing system includes pumping heated adhesive to a dispenser gun from a hot melt unit. The method also includes sending gun actuation signals from a source of gun actuation to a melter control system of the hot melt unit and then to the dispenser gun to cause the dispenser gun to dispense adhesive onto a substrate. The gun actuation signals are monitored at the melter control system, and the melter control system collects information regarding actuations of the dispenser gun based on the monitored gun actuation signals.

The method may also include performing one or more diagnostic processes pertaining to the dispenser gun and the dispensing system as a whole based on the monitored gun actuation signals. In one example, a diagnostic process may include monitoring a total actuation count for components of the dispenser gun, and providing an indication that one of the components will require repair or replacement after the component has reached a predetermined percentage of a predicted total life cycle. In another example, a diagnostic process may include comparing operational parameters of the hot melt unit to operational parameters of the dispenser gun, and identifying error states or potential fault conditions based on the comparison of parameters. Other diagnostic processes include activation of a standby state and comparing current drawn by a solenoid of the dispenser gun to a known current waveform that occurs during normal operation.

According to another embodiment, a method of operating an adhesive dispensing system includes dispensing an adhesive and sensing the operation of a component of the adhesive dispensing system. The method also includes determining whether the component requires service in response to the sensing. A need for service is indicated when it is determined that the component requires service. Determining whether the component requires service may also include accumulating and storing data associated with the sensed operation of the component, and comparing the accumulated data to reference data associated with a life of the component. This reference data may be adjusted to account for characteristics that affect the life of the component, such as the adhesive dispensed, the application temperature for the adhesive, the viscosity of the adhesive, and abrasion qualities of the adhesive.

Indicating the need for service may be performed in various ways, including actuating a visual indication on a control unit, sending a communication to a serviceman, and/or ordering a new component from a vendor. In one aspect, sensing the operation of the component may include at least one of sensing the actuation of an adhesive dispensing gun, sensing the heating of a hose, and sensing the operation of a pump. In another aspect, sensing the operation of the component further includes determining a total number of cycles of operation performed with the dispensing module. In these circumstances, determining whether the component needs service may further include determining a predicted remaining life of the dispensing module based on a rate of use of the dispensing module and based on a comparison of the total number of operational cycles relative to reference data indicative of a predicted life cycle. A new dispensing module may be ordered when the predicted remaining life is less than a predetermined set point. When this occurs, a down time for servicing the adhesive dispensing system may be scheduled, and other components of the system that need service may be scheduled to have service during that down time. Therefore, the adhesive dispensing system is automatically monitored and serviced before breakdowns occur.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE ILLUSTRATIVE EMBODIMENTS

Figure 1:
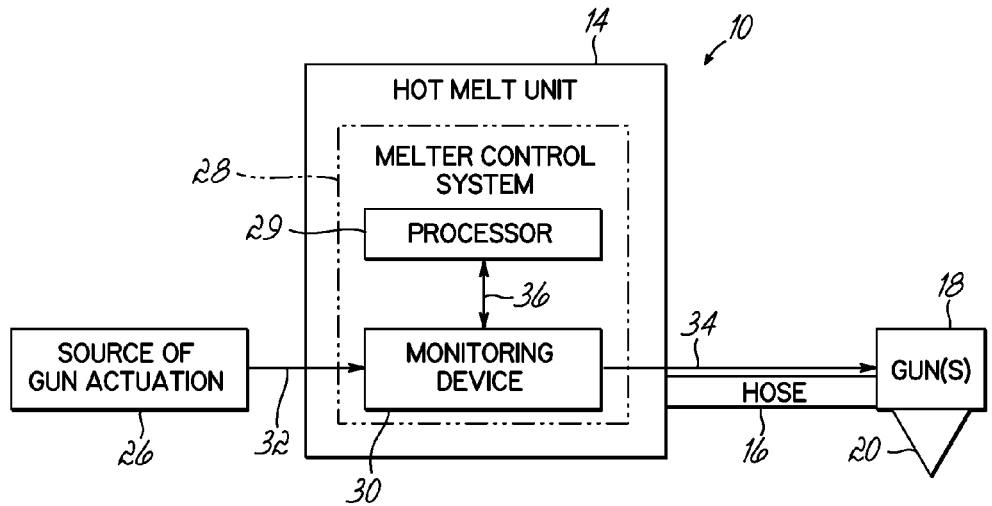
FIG. 1 is a schematic view of a dispensing system according to one embodiment of the current invention.
Figure 2:
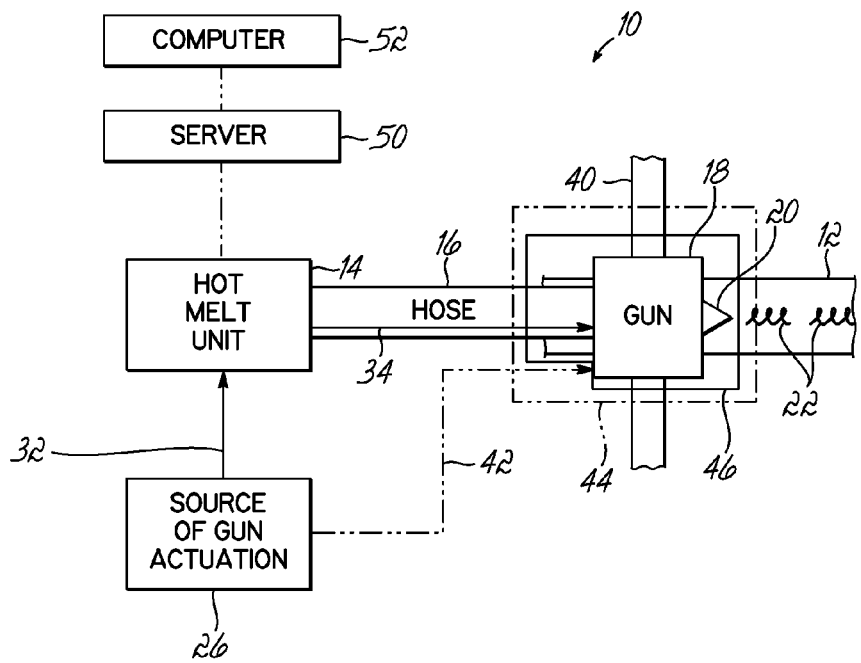
FIG. 2 is a plan view of the dispensing system of FIG. 1, with conventional connections shown in phantom for comparison purposes.

Referring to FIGS. 1 and 2, a dispensing system 10 in accordance with one embodiment of the invention is illustrated in schematic form. To this end, the dispensing system 10 of the exemplary embodiment is specifically configured to apply hot melt adhesive in a molten state to a substrate 12 such as packaging materials, nonwoven articles, and other types of products requiring adhesion during assembly. Thus, the dispensing system 10 includes a hot melt unit 14 configured to receive adhesive material from an adhesive source (not shown), and then heat and melt the adhesive material to a desired application temperature. One example of a hot melt unit 14 that may be used with the dispensing system 10 is the melter described in U.S. patent application Ser. No. 13/659,291 to Jeter (entitled "Mountable Device For Dispensing Heated Adhesive"), which is co-owned by the assignee of the current application and the disclosure of which is hereby incorporated by reference herein in its entirety. In another example, the specific components and operation of the dispensing system 10 are described in further detail in co-pending U.S. patent application Ser. No. 13/799,622 to Clark et al., entitled "Adhesive Dispensing Device Having Optimized Reservoir and Capacitive Level Sensor", the disclosure of which is hereby incorporated by reference herein in its entirety. It will be appreciated that other types of hot melt units 14 (such as floor mounted melters) may be used without departing from the scope of the invention. Furthermore, these hot melt units 14 are modified to include additional elements as described in further detail below.

The adhesive defines a molten state at the desired application temperature and is supplied through a hose 16, which may be heated, to at least one dispenser gun 18, which is also referred to as a dispenser module. As well understood, each of the dispenser guns 18 (only one of which is shown in the Figures) includes an outlet nozzle 20, a valve (not shown) for controlling flow through the outlet nozzle 20, and a solenoid (not shown) for actuating movement of the valve between open and closed positions. For example, the dispenser gun 18 may include a contact nozzle, the Universal™ CF nozzle, or the Signature™ nozzle, each of which is commercially available from Nordson Corporation of Westlake, Ohio. The dispenser gun 18 actuates the valve to apply the hot melt adhesive 22 in a pattern onto the substrate 12 as shown in FIG. 2. As described in further detail below, the dispenser gun 18 is operatively coupled to the hot melt unit 14 such that the hot melt unit 14 can monitor and optionally control the operation of the dispenser gun 18. Advantageously, this operative coupling enables a series of system diagnostics such as life cycle monitoring to be performed at the hot melt unit 14 or at a remote computer. These diagnostics, in turn, provide sufficient information to plan for maintenance or replacement of components during regular downtimes of the dispensing system 10, thereby increasing the reliability and overall uptime for the end consumer. In other words, the diagnostics make the dispensing system 10 more robust as described below, which results in the increased reliability.

With particular reference to FIG. 1, the dispensing system 10 also includes a source of gun actuation 26, which is configured to supply signals to operate the solenoid and therefore operate the valve within the dispenser gun 18. The source of gun actuation 26 may take various forms, including a programmable logic controller, a programmable limit switch, an external pattern control, or a pattern control integrated into another unit. The source of gun actuation 26 is located outside the hot melt unit 14 in the exemplary embodiment. Normally, this source of gun actuation 26 would be directly coupled to the dispenser gun 18 via electrical cables configured to carry the electrical signals to the solenoid. In contrast, the exemplary embodiment of the dispensing system 10 connects this source of gun actuation 26 to the hot melt unit 14. More specifically, the hot melt unit 14 includes a melter control system 28 having a processor 29 and a monitoring device 30 connected to the processor 29. The monitoring device 30 may also take multiple forms including sensors communicating with the processor 29 or a data input to the processor 29. Regardless of the structure defining the monitoring device 30, the melter control system 28 receives the gun actuation signals from the source of gun actuation 26. As described in detail below, this enables the melter control system 28 to operate a plurality of diagnostics pertaining to the dispenser gun 18 and to the dispensing system 10 as a whole because a single processor 29 has access to all actuation and control signals for components of the dispensing system 10.

In one particular example, the monitoring device 30 may include a connecting device such as a terminal block, which is a circuit board with connection receptacles (not shown) configured to receive a first cable 32 extending from the source of gun actuation 26 and a second cable 34 extending to the dispenser gun 18 (both cables 32, 34 are shown as arrows in the schematic Figures). The terminal block terminates the actuation signals sent from the source of gun actuation 26 and selectively passes those signals on to the dispenser gun 18. The terminal block is operatively connected to the melter control system 28 as indicated by arrow 36. Consequently, the melter control system 28 is provided with access to the gun actuation signals that would normally be sent directly for termination at the dispenser gun 18. This access to the gun actuation signals enables a plurality of system diagnostics described in further detail below. It will be understood that the monitoring device 30 may include other devices capable of passing the gun actuation signals to the processor 29 and may also include elements outside the melter control system 28 in other embodiments consistent with the scope of the invention.

The dispensing system 10 is shown in a schematic top plan view in FIG. 2 to illustrate additional benefits of monitoring the gun actuation signals within the hot melt unit 14. As shown in this Figure, the dispenser gun 18 may be mounted along a gantry frame 40 such that the dispenser gun 18 can translate relative to the substrate 12. In other similar embodiments, the dispenser gun 18 may be mounted on a robotic arm or some other moveable mechanism for translating the dispenser gun 18. The source of gun actuation 26, which is located outside the hot melt unit 14, is conventionally directly connected to the dispenser gun 18 by an individual cable 42, shown in phantom in FIG. 2. This configuration results in a large conventional gun envelope 44, also shown in phantom in FIG. 2. The "gun envelope" is defined as the space required for the dispenser gun 18 and all wiring paths of hoses, cables, or other connectors that extend to other components directly connected to the dispenser gun 18. With the hose 16 and the individual cable 42 extending in divergent directions from the dispenser gun 18, the conventional gun envelope 44 is relatively large.

By contrast, the dispenser gun 18 of the exemplary embodiment is directly connected to the hot melt unit 14 by the heated hose 16 and by the second cable 34, which runs directly alongside or possibly even within the hose 16. In this regard, FIG. 1 illustrates the second cable 34 being coupled to the heated hose 16 and FIG. 2 illustrates an alternative embodiment in which the second cable 34 is routed through the heated hose 16. When the cable 34 is routed through the heated hose 16, an example of this arrangement would include placing the cable 34 within the outer protective covering of the heated hose 16 but outside the innermost tube and heating elements used as the conduit for the adhesive. Consequently, the cable 34 is not exposed or affected by the adhesive, but the cable 34 is located within at least a portion of the heated hose 16 in such embodiments like the one shown in FIG. 2. The source of gun actuation 26 is not directly coupled to the dispenser gun 18 and therefore does not become part of an optimized gun envelope 46. As a result of these modifications, the optimized gun envelope 46 having a smaller size than the conventional gun envelope 44 is defined by the exemplary embodiment of the dispensing system 10, as shown for comparison in FIG. 2. The reduction of size in the optimized gun envelope 46 reduces the space required for installation and operation of the dispensing system 10 because fewer items are hanging off the dispenser gun 18 or extending in diverse directions from the dispenser gun 18. The parallel or identical path followed by the hose 16 and the second cable 34 improves the overall aesthetics of the dispensing system 10 by reducing the number of different items hanging from the dispenser gun 18. Moreover, the smaller optimized gun envelope 46 also improves the robustness of the dispenser gun 18, meaning that the dispenser gun 18 can move and flex the connections of the hose 16 and the second cable 34 with less risk of inadvertent interference or disconnection of these elements from the dispenser gun 18. The improved robustness also results in less vibrations where the connections of the hose 16 and the cable 34, thereby reducing the likelihood of disruption of the dispensing system 10 (e.g., reduced down time and increased reliability). In this regard, the smaller optimized gun envelope 46 provides a more favorable environment within which to make the cable connections needed to deliver actuation signals to the dispenser gun 18.

Also as shown in FIG. 2, the hot melt unit 14 and specifically the melter control system 28 may be in communication with a server 50 located proximate to the dispensing system 10 or remote from the dispensing system 10. The server 50 collects data from the melter control system 28 and is operable to deliver this data to a computer 52 located away from the dispensing system 10. As a result, diagnostics run by the melter control system 28 and information regarding the operation of the dispensing system 10 may be stored or viewed in the most convenient location for the user, whether that location is at the dispensing system 10 or remote from the dispensing system 10. It will be understood that the communication between the hot melt unit 14, the server 50, and the computer 52 may be conducted via wireless data transfer, wired connections, or other known methods. It will also be understood that a programmable logic controller may be used in place of the server 50 and computer 52 in other embodiments for operating the diagnostics, and these alternative embodiments are within the scope of the current invention.

Figure 3:
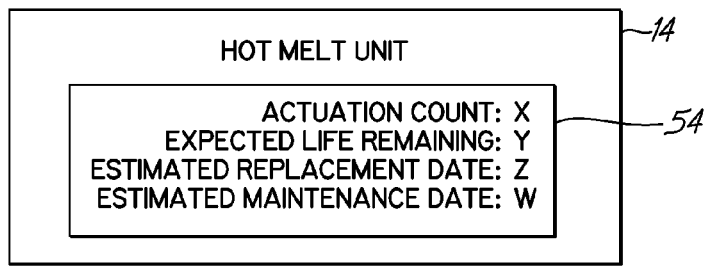
FIG. 3 is a front view of a user interface used with the dispensing system of FIG. 2, specifically showing statistics derived from monitoring gun actuation signals.
Figure 4:
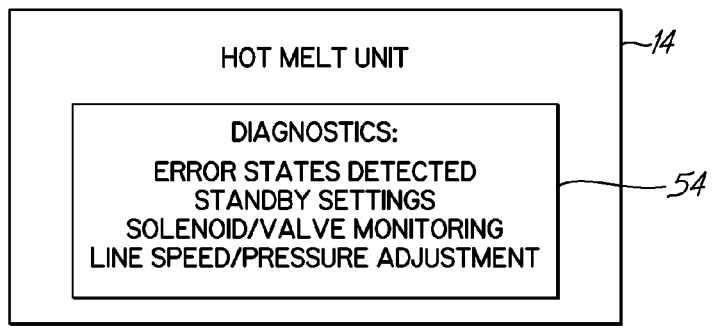
FIG. 4 is a front view of the user interface of FIG. 3, specifically showing several diagnostics that may be performed by the dispensing system.

At least one or both of the hot melt unit 14 and the computer 52 includes a controller having a processor and a memory (for example, the processor 29 shown in the melter control system 28 of the hot melt unit 14 in FIG. 1). The controller(s) also include program code resident in the memory and configured to be executed by the processor. The program code operates to monitor the gun actuation signals delivered to the hot melt unit, to perform diagnostics based on the monitored signals, and to control the gun actuation signals by selectively passing these signals through the dispenser gun 18. The hot melt unit 14 and the computer 52 also include one or more display screens 54 configured to act as a user interface between the controller(s) and a user of the dispenser system 10. Although these display screens 54 are not shown in FIGS. 1 and 2, an example of such a display screen 54 is shown in FIGS. 3 and 4 as located on the hot melt unit 14. It will be understood that other types of I/O interfaces may also be provided in the dispensing system 10 for interacting with the controller(s).

With particular reference to FIGS. 3 and 4, the display screen 54 illustrates several pieces of information that may be collected by the dispensing system 10 and several diagnostics that may be run automatically or as desired by the user. This collected information and all of the diagnostics described in detail below result, at least in part, from the monitoring and/or termination of the gun actuation signals within the hot melt unit 14. To this end, the melter control system 28 (and optionally, the server 50 and computer 52) can monitor the gun actuation signals being sent from the source of gun actuation 26 to the monitoring device 30. With this information about what is happening with the dispenser gun 18, the melter control system 28 has access to all information that may be required when monitoring the operation of the components of the dispensing system 10 and thereby verifying that the interaction between these components is not causing errors. Several examples of the diagnostics enabled by the dispensing system 10 of the exemplary embodiment are now described in detail, although it will be understood that other diagnostics and processes are also possible using this arrangement of components. The generic term "controller" is used in the following description to describe the melter control system 28 and other similar components of the dispensing system 10 that have access to all of the operation data pertaining to the hot melt unit 14 and the dispenser gun 18.

A first diagnostic that may be performed by the controller is a life cycle monitoring diagnostic. As shown by FIG. 3, for any particular component within the hot melt unit 14 or, more importantly, within the dispenser gun 18, the number of total actuations can be counted from the monitoring of the appropriate actuation signals. For example, the number of solenoid actuations and valve actuations at the dispenser gun 18 may be monitored by counting how many actuation signals are sent from the source of gun actuation 26 and intercepted at the monitoring device 30. If queried by a user for the information collected by this life cycle monitoring diagnostic, the display screen 34 at the computer 52 or at the hot melt unit 14 may appear as shown in FIG. 3. More particularly, the controller is operative to prompt the display screen 54 to illustrate a total actuation count "X" for the component in question, an expected amount of life remaining "Y" in percent or cycles, and an estimated replacement date "Z" for that component based on the usage history of the component. Similar to the replacement date "Z" for the component in question, the display screen 34 may also illustrate an estimated maintenance date "W" for the component based on the usage history of the component in order to inform an operator when the next regularly scheduled maintenance should occur. Thus, in the example of the gun actuation signals terminated at a terminal block, the life cycle of the solenoid and the valve can be tracked over time without requiring additional input from the end user. Thus, instead of only knowing that a dispenser gun 18 needs repair or replacement after a fault occurs, these events can be anticipated and appropriate preparations can be made to limit the impact of the components coming to the end of the life cycle.

The controller is pre-loaded with a predicted total life cycle, which is an average number of actuations or cycles in the case of valves and solenoids, before the component is likely to fail. This predicted total life cycle is primarily based on historical data for similar batches of components and also based on test data collected by the manufacturer of the components. Several factors may also be programmed in to adjust the predicted total life cycle to fit the particular circumstances in which the component is placed in operation. In a dispenser gun 18, for example, the rate of use, duty cycles, the particular materials dispensed, the operating temperature, and viscosity of the fluid dispensed all could be known factors that adjust the predicted total life cycle. These factors may be adjusted by the manufacturer or the end user, both before and during use of the component.

Furthermore, the predicted total life cycle that is originally pre-loaded during manufacture of the component may also be updated periodically based on new information about the average monthly life of the same batch of components. In this regard, the manufacturer of the component may continue to test the total life cycle for sample components from batches of components that have already been installed and operated at the location of end users. These ongoing test results and data collected from other end users may be used by a manufacturer to update a predicted total life cycle for a component in real time (e.g., a batch of components manufactured last February may be experiencing longer than expected total life cycles, while a batch of components manufactured last April may be experiencing shorter than expected total life cycles). This updated information on average monthly life for a particular batch of components may be provided to the controller via the manufacturer's website on the Internet or via inputs received from a technician or repairman during regular periodic visits to the facility of the end user. In one example, the technician may carry a handheld device with the latest updated information on predicted total life cycles, and this handheld device may wirelessly communicate this information to the controllers within the facility to cause the controllers to update this information for use in the life cycle monitoring diagnostic. This updating process also allows the manufacturer to adjust the predicted total life cycles with conservative estimates to reduce the number of components that will fail before an end user is prompted to repair or replace the component.

Regardless of whether the life cycle monitoring diagnostic uses the originally pre-loaded information on a predicted total life cycle or updated information received from the manufacturer on a periodic basis, the diagnostic may be used to provide useful warnings and indications to the end user. Depending upon the preferences of the end user, the controller may operate to provide one or more levels of warning when a component has reached a certain percentage of the predicted total life cycle. In an exemplary embodiment, the controller could provide a first indication to the end user at one or more of the display screens 54 when a component has reached a certain percentage of the predicted total life cycle, the first indication informing the end user that servicing or replacement of the component should be considered soon. The controller could then provide a second indication to the end user at one or more of the display screens 54 when a component has reached a higher percentage of the predicted total life cycle, the second indication prompting the end user to service or replace the component as soon as possible. These indications may be flashing gun icons in various colors at the hot melt unit 14 or at the computer 52, in the case of monitoring the solenoid or valve of the dispenser gun 18. The end user can then take appropriate actions to avoid extensive downtime caused by failure of the components at the end of the life cycles.

More specifically, the life cycle monitoring diagnostic enables a seamless dispensing system 10 that is configured to sustain itself and maximize operational uptime for the end user by operating and maintaining the dispensing system 10 largely without input from the end user. In this regard, the indications that are provided to the end user by the life cycle monitoring diagnostic may also include a part number or other ordering information that can be used to order replacement components from the manufacturer. In a more automated system, the indication may prompt an automatic reordering of the replacement component or the scheduling of a service appointment with a technician from the manufacturer. In these embodiments, the replacement parts and the service personnel arrive in advance of the predicted end of the life cycle and therefore likely prevent the dispensing system 10 from going offline without a replacement component being on hand. Whether the end user manually reorders a replacement component or the component is automatically reordered, the controller may also be provided with information about when the end user's facility is regularly scheduled for downtime and what the current lead time and availability are for certain components. Based on this additional information, the indications and warnings provided by the life cycle monitoring diagnostic may be adjusted in time to ensure that replacement components are ordered and received at the facility in advance of a convenient downtime, during which the replacement component may be installed without negatively impacting the operation of the end user's facility.

Additionally, many end users operate multiple dispensing systems 10 in parallel and the controllers associated with these dispensing systems 10 may be in operative communication with one another. In these embodiments, there may be a point in the usage of all the dispensing systems 10 where it will become more economically cost-effective to replace the same component of all dispensing systems 10 at the same time rather than one-at-a-time on various schedules for each of the dispensing systems 10 (e.g., the technician only has to make a single trip to the facility rather than a plurality of trips). The manufacturer or end user can collect the cycle rates and rates of usage for all of the dispensing systems 10 in a facility, so that a determination can be made for when the end user should receive a recommendation to replace similar components in all dispensing systems 10. Again, this replacement can be scheduled for a regularly scheduled downtime or shut down of the end user's facility, such that the end user can operate with significantly less down time for system maintenance. It will be understood that this diagnostic process may be performed for any of the components in the dispensing system 10.

Consequently, the termination and monitoring of the gun actuation signals within the hot melt unit 14 of the dispensing system 10 enables the life cycle monitoring diagnostic for various components, including the solenoid and the valve of the dispenser gun 18. Using this life cycle monitoring diagnostic, an end user can plan for these components reaching the expected end of their life cycles and schedule repair or replacement at the convenience of the end user. As a result, the total downtime caused by components of the dispensing system 10 reaching the end of a life cycle is minimized compared to systems that cannot run diagnostics on certain components of the dispensing system 10. The seamless monitoring and replacement of components can be performed automatically without input from the end user, if so desired, and this effectively provides a dispensing system 10 that sustains itself as much as possible. Both the end user and the manufacturer will benefit from reducing the number of emergency component replacements that must be performed. Accordingly, the monitoring of gun actuation signals within the hot melt unit 14 provides significant diagnostic and system maintenance benefits.

Additional diagnostics enabled by the dispensing system 10 of the exemplary embodiment are listed on the display screen 54 in FIG. 4 and described in detail below. Another diagnostic that may be performed by the controller is the detection of error states encountered by the dispensing system 10. To this end, the controller can monitor the current state of the components of the dispenser gun 18 and the components of the hot melt unit 14 to detect any inconsistencies that would result in an error or a failure. For example, if the dispenser gun 18 is being actuated to open the valve without the pump of the hot melt unit 14 being active, this could lead to a draining of adhesive material within the dispenser gun 18. Thus, this state with the valves in the dispenser gun 18 actuating and the hot melt unit 14 not delivering adhesive material is an error that can lead to an alarm or indication being provided to the operator at one or more of the display screens 54. In a similar example, the valves in the dispenser gun 18 could be receiving actuation signals when the hot melt unit 14 is not completely warmed up and ready to deliver adhesive material to the dispenser gun 18. This is another error state that can be detected because of the monitoring of the gun actuation signals in the hot melt unit 14. The pump of the hot melt unit 14 should also not be delivering more adhesive material to the dispenser gun 18 when all of the valve(s) at the dispenser gun 18 remain in a closed position. These error states cannot be detected without monitoring elements at the dispenser gun 18 and at the hot melt unit 14 simultaneously, which the dispensing system 10 of the exemplary embodiment is capable of doing. It will be appreciated that other known error states may be programmed into the diagnostic processes for detection, thereby making the end user aware of problems during operation.

As discussed above, the detection and identification of these error states is beneficial because an indication may be provided to the end user of the particular error states that have occurred. In addition, the dispensing system 10 of the current invention is also operable to respond to some of these error states to avoid malfunctions of the dispensing system. For example, if the pump at the hot melt unit 14 is not operating when signals are being sent to actuate the dispenser gun 18, then the controller may correct this error state by not permitting the gun actuation signals to be passed through to the dispenser gun 18. In this regard, some level of limited control may be exerted on the actuation of the dispenser gun 18 by the termination of the gun actuation signals at the terminal block (in embodiments where the monitoring device 30 includes the terminal block). In the example above, the gun actuation signals could be allowed to pass to the dispenser gun 18 once the pump within the hot melt unit 14 is ready to operate. As a result, these error states may be identified and addressed when using this diagnostic feature in certain circumstances.

A similar type of diagnostic process that may be performed by the dispenser gun 10 of the exemplary embodiment is the comparison and use of relative relationships to detect operational faults or an imminent operational fault. More specifically, a certain ratio of monitored signals, such as the ratio of valve actuations at the dispenser gun 18 to the pump cycles at the hot melt unit 14, may be tracked over time to adaptively learn what occurs to these ratios during or immediately before certain faults of the dispenser system 10. These relative relationships may not be absolutely indicative that the fault has occurred or will occur, but the information can inform an end user of potential situations that may require maintenance or correction. In the example of the ratio of valve cycles to pump cycles given above, various events such as the use of an incorrect nozzle size, a clogged filter, an inadvertent pressure adjustment, an inoperable PDV, a dispensing pattern change, and other operational events can have predictable effects on this ratio. Thus, as these events are correlated to the monitored ratio or ratios over time, the diagnostic process becomes able to predict or identify certain types of faults for the end user, possibly even before the faults occur. This diagnostic process can provide this information to an end user or a technician such that the correct fault may be addressed as quickly as possible, thereby minimizing unexpected downtime of the dispensing system 10.

Another diagnostic enabled by the monitoring of gun actuation signals within the hot melt unit 14 is the activation of one or more standby settings during periods of inactivity of the dispensing system 10. In adhesive dispensing systems where the adhesive material is heated to a molten state at a desired application temperature, the adhesive material should not be held at the desired application temperature for long periods of time before dispensing onto the substrate 12. To this end, the adhesive material can possibly degrade or char within the hot melt unit 14, the hoses 16, or the dispenser gun 18 when held at the elevated temperature during long periods of inactivity of the dispenser gun 18. As a result, it has been desirable to provide a standby state that may be invoked during a long period of inactivity. The standby state reduces the heat energy applied to the adhesive material to allow the adhesive material to drop to a lower temperature at which the risk for degradation or charring is insubstantial. Standby states are particularly useful with dispenser guns 18 having fast warm-up times because the dispenser system 10 can be brought back to a ready condition for dispensing more rapidly from standby than from a complete shutdown state.

The hot melt units 14 of conventional designs and the current exemplary embodiment are typically provided with a standard input/output I/O unit that could receive up to four input pins for receiving signals from outside the hot melt unit 14 and up to four output pins for sending signals from the hot melt unit 14. Many end users prefer having a standby state enabled, and this would always take up one or more of the input pins to provide signals related to the usage rate of the dispenser gun 18 in conventional designs. The I/O unit would then be limited from receiving other outside signals that may be pertinent and useful to the controller at the hot melt unit 14 because one or more of the input pins would usually be dedicated to actuating a standby state. By contrast, the controller at the hot melt unit 14 of the exemplary embodiment has access to the gun actuation signals terminated at the terminal block and can therefore monitor the length of time elapsed since the last actuation of the dispenser gun 18. The corresponding diagnostic process run by the controller can continuously monitor this length of time and automatically actuate a standby state if a predetermined threshold of time since the previous gun actuation has been exceeded. This threshold may be set by the end user to fit the particular circumstances of the facility. The standby state may be used to reduce the temperature of the adhesive material within a dispenser gun 18 and the corresponding hoses 16 only, or within an entire dispensing system 10 including multiple dispenser guns 18. Consequently, the monitoring of gun actuation signals within the hot melt unit 14 enables the controller to automatically actuate standby states according to the end user's preferences without dedicating any of the input pins of the I/O unit on the hot melt unit 14 to this task. The I/O unit may then be used for other purposes, thereby expanding the utility of the controller within the hot melt unit 14. In addition to enabling the use of a standby state, the monitoring of gun actuation signals may be used by the controller to operate a smart melt mode for reducing charring and degradation of adhesive material, as described in detail at co-pending U.S. patent application Ser. No. 13/799,737 to Bondeson et al., entitled "Adhesive Dispensing System and Method Using Smart Melt Heater Control" the disclosure of which is hereby incorporated by reference herein in its entirety.

Yet another diagnostic process that is enabled by the exemplary embodiment of the dispensing system 10 is an adjustment of the fluid pressure applied by the hot melt unit 14 to correspond to the line speed at the dispenser gun 18. It is well understood that when line speeds are increased at the dispenser gun 18, more adhesive material flows out of the dispenser gun 18 at a higher rate, and this adhesive material must be delivered at a corresponding higher pressure by the hot melt unit 14 to force the higher amount of adhesive to and through the dispenser gun 18. Similar to the standby state operation described above, conventional system designs dedicated one or more of the input pins at the I/O unit to supplying the line speed for corresponding adjustment of the adhesive pressure. In addition to taking up one of the valuable limited input pins, the signal indicative of line speed is generally an analog signal that requires more expensive I/O equipment to handle than a digital signal.

In contrast, the dispenser system 10 of the exemplary embodiment has access to the gun actuation signals monitored at the monitoring device 30. The controller of the hot melt unit 14 can then deduce from the frequency and duration of these gun actuation signals an estimated value for the line speed being currently run at the dispenser gun 18. This estimated value may not be an absolute line speed, but the value is accurate enough to enable pressure adjustment of the adhesive upwardly or downwardly when it is determined that the line speed has changed. The diagnostic operated by the controller is enabled to make these pressure adjustments for line speed changes without the provision of a separate analog input corresponding to the actual line speed. Consequently, the monitoring of gun actuation signals within the hot melt unit 14 enables the controller to automatically actuate necessary adhesive pressure adjustments without dedicating any of the input pins of the I/O unit on the hot melt unit 14 to this task.

The monitoring of the gun actuation signals for the diagnostics described above is typically an on/off type of check of the voltage applied in the signal. However, the current drawn by the solenoid at the dispenser gun 18 may also be monitored at the monitoring device 30 when the signals are passed through to the solenoid. If such current monitoring is performed by the controller, then additional diagnostics pertaining to the operational status of the solenoid are enabled. To this end, each solenoid design from a certain manufacturer will draw current in a predictable waveform when the solenoid is switched from one operational state to another. This waveform or "current signature" may be determined for each type of solenoid that may be used with the dispensing system. Thus, the actual current signature being emitted from the solenoid may be tracked by the controller by monitoring the current drawn through the second cable 34 at the gun actuation signals.

Instead of having to hook an oscilloscope up to the dispenser gun 18 to determine whether the current signatures are following the expected waveforms, the controller can continuously monitor whether the solenoid is drawing current in accordance with the expected waveform. If these current signatures or waveforms do not match, then this is a precursor to a failure of the solenoid or an indication that the solenoid is malfunctioning. The comparison of the current signatures and waveforms can also be used to determine whether the solenoid is switching states too slowly for the desired application pattern. If the solenoid is too slow for the intended operation, the controller can effectively recommend that the solenoid be changed to a design that switches fast enough for the desired application of the dispenser gun 18. If current monitoring is used with the monitoring of gun actuation signals within the hot melt unit 14, then these additional diagnostics can improve the robustness and reliability of the dispensing system 10 and increase the amount of information available to an end user.

Another type of diagnostic process enabled by the dispensing system 10 of the exemplary embodiment is a coordination of when a piston pump is shifted to avoid a phenomenon known as "pump wink" at the beginning or end of a dispensing pattern. Pump wink is a smaller bead of adhesive material ejected from the dispenser gun 18 that is caused by the switching of directions of a piston pump at the hot melt unit 14, which occurs each time the piston nears the limit of how far it can translate in a given direction. Whenever the piston of the piston pump switches directions, a momentary drop in pressure of the adhesive occurs, which leads to a brief reduction in fluid delivery to the dispenser gun 18. The movement of the piston and the switching of the piston movement direction can be adjusted to minimize the number of times that pump wink occurs in a final dispensed pattern of adhesive.

In this regard, the controller of the hot melt unit 14 can monitor the gun actuation signals at the monitoring device 30 to determine when the dispenser gun 18 is actively dispensing and when the dispenser gun 18 is between cycles. The controller can then be used to "shift" the timing of the piston movement reversal at the piston pump to correspond most frequently or always with the break between dispensing cycles. For shorter actuation signal patterns, the piston movement reversal and the corresponding pump wink can be avoided altogether. For longer actuation signal patterns, the piston movement reversal is shifted as well as possible to be within the center of the gun actuation signal to avoid reduced output at the ends of a dispensing pattern, where the amount of adhesive applied may be critical. As a result of monitoring both the operational characteristics of the piston pump in the hot melt unit 14 and the gun actuation signals at the monitoring device 30, the controller is capable of running this diagnostic process to minimize or eliminate the phenomenon of pump wink in the dispensing systems 10.

It will be understood that the foregoing description of diagnostics are but a few examples of the diagnostic processes that may be enabled by the termination and monitoring of gun actuation signals within the hot melt unit 14. Additional diagnostics will be readily appreciated and easily enabled when using the dispensing system 10 of the current invention.

Figure 5:
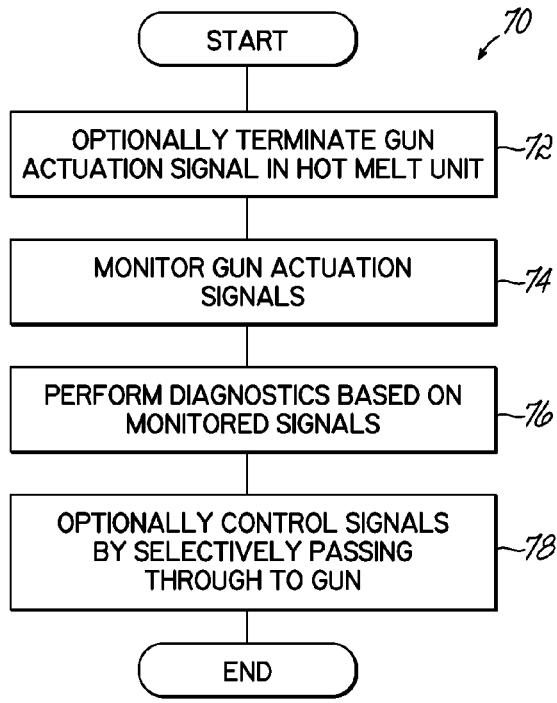
FIG. 5 is a flowchart illustrating a method of terminating and monitoring gun actuation signals that is used with the dispensing system of FIG. 1.

A flowchart illustrating a series of operations 70 of the controller(s) in the dispensing system 10 is shown in FIG. 5. In this regard, the controller optionally terminates gun actuation signals within the hot melt unit 14 at step 72. The controller also monitors these gun actuation signals that are terminated at the terminal block at step 74. One or several diagnostics may then be performed by the controller based on the monitored signals at step 76. These diagnostics may include monitoring life cycles of the components of the dispensing system 10, checking for error states, actuating standby states, and adjusting parameters of the hot melt unit 14 when required, among other diagnostic processes. In addition, the controller may optionally exert limited control of the gun actuation signals by selectively passing or blocking the signals from going through the terminal block and to the dispenser gun 18 at step 78. Consequently, the series of operations 70 performed by the controller in the dispensing system 10 provides numerous advantageous benefits over conventional designs, including improved aesthetics, higher robustness in a smaller optimized gun envelope, and a significant number of diagnostics used to sustain the operation of the dispensing system 10 and reduce downtime during normal operating hours of the end user.

Figure 6:
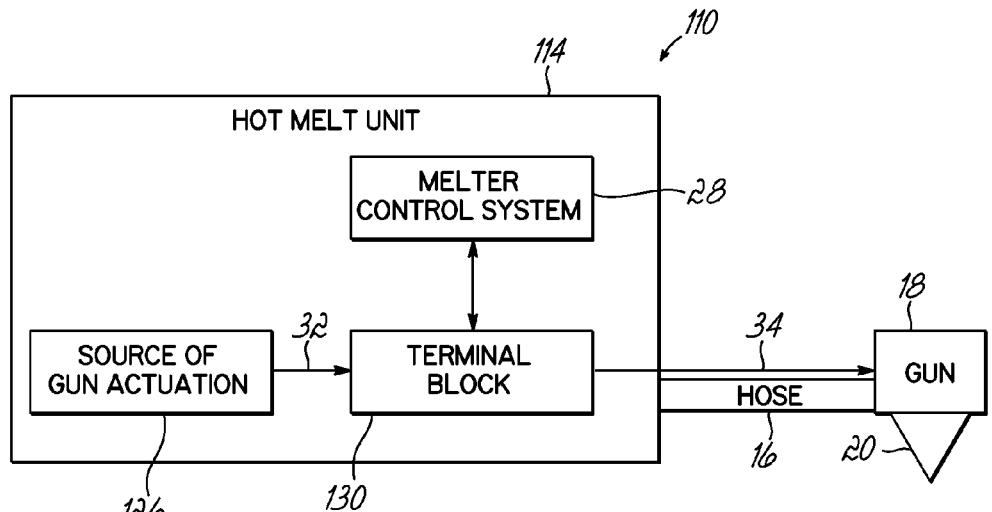
FIG. 6 is a schematic view of a dispensing system according to an alternative embodiment of the current invention, including a source of gun actuation within the hot melt unit.

An alternative embodiment of the dispensing system 110 in accordance with the current invention is provided in FIG. 6. In this Figure, the same reference numbers from the previous embodiment have been applied where the components are identical, including the hose 16, the dispenser gun 18, and the outlet nozzle 20. In this embodiment of the dispensing system 110, the hot melt unit 114 is modified such that the source of gun actuation 126 is located within the hot melt unit 114. This source of gun actuation 126 is a subsystem of the hot melt unit 114 and is still a separate element from the melter control system 28. As a result, the hot melt unit 114 continues to include a connecting device in the form of a terminal block 130 for terminating the gun actuation signals generated by the source of gun actuation 126. It will be understood that other embodiments of the dispensing system 110 may include other types of connecting devices where the actuation signals come through the hot melt unit 114 without departing from the scope of the invention. The dispensing system 110 of this embodiment differs only from the dispensing system 10 of the previous embodiment in the location of the source of gun actuation 126. Regardless of whether the gun actuation signals come from a source outside the hot melt unit 114 or from a subsystem within the hot melt unit 114, the same operation and diagnostics of the controller discussed above are applicable to the dispensing system 110. Thus, the dispensing system 110 achieves the same benefits as the previous embodiment.

Figure 7:
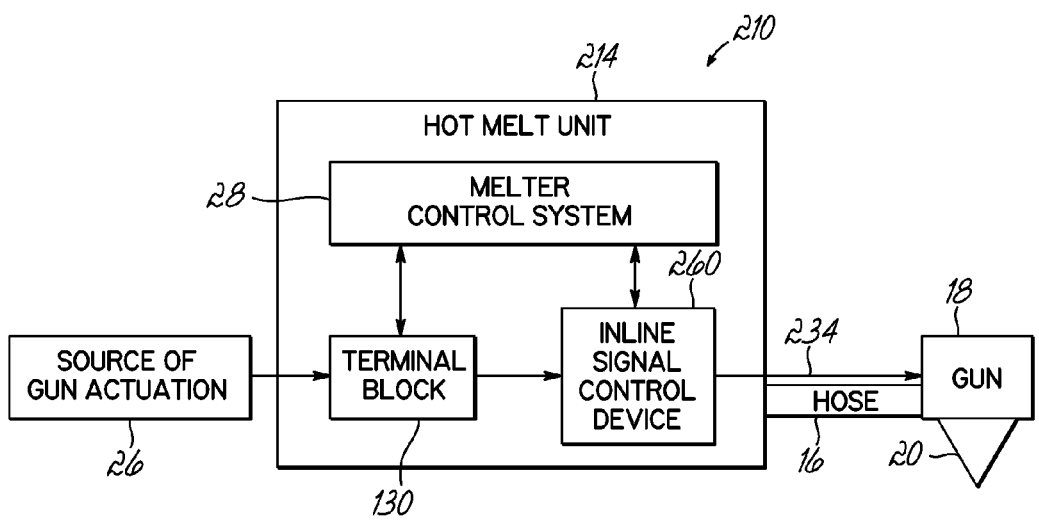
FIG. 7 is a schematic view of a dispensing system according to another alternative embodiment of the current invention, including an inline signal control device located within the hot melt unit.

Yet another alternative embodiment of the dispensing system 210 in accordance with the current invention is provided in FIG. 7. In this Figure, the same reference numbers from the previous embodiments have been applied where the components are identical, including the hose 16, the dispenser gun 18, and the outlet nozzle 20. Similar to the first described embodiment, the source of gun actuation 26 is located outside the hot melt unit 214 of the dispensing system 210. The source of gun actuation 26 is still connected to a terminal block 130 within the hot melt unit 214 such that a melter control system 28 can monitor the gun actuation signals. The hot melt unit 214 of this embodiment differs in that an inline signal control device 260 has been added along the second cable 234 running between the terminal block 130 and the dispenser gun 18. The inline signal control device 260 may be any type of device that is operable to exert additional control on the gun actuation signals beyond just a simple decision whether to pass the signals through or not, which is all the control possible with the terminal block 130. Similar to the terminal block 130, the inline signal control device 260 communicates with the melter control system 28 as shown in FIG. 7. It will also be understood that the inline signal control device 260 could be added to a system with a monitoring unit rather than a terminal block 130 in other embodiments consistent with the scope of the invention.

In one example, the inline signal control device 260 is operable to apply a "stitching" process to longer gun actuation signals. In this regard, a longer gun actuation signal may be five seconds in length. For a plurality of reasons, including reducing the use of adhesive and minimizing the effect of pump wink as described above, it may be desirable to break this long actuation signal into multiple smaller and closely spaced actuated signals that are "stitched" together by the short off cycles between the signals. A five second long gun actuation signal could be broken into ten nearly 0.5 second long gun actuation signals in quick succession by the inline signal control device 260. In addition, the inline signal control device 260 can apply other substantive modifications to the gun actuation signal such that the dispensing system 210 operates efficiently and without invoking any error states. The higher amounts of control that can be used in this embodiment of the dispensing system 210 advantageously enable nearly all of the diagnostics an end user would want and sufficient controls for the entire dispensing system 210.

In summary, the dispensing systems 10, 110, 210 of the current invention provide multiple benefits as a result of terminating the gun actuation signals within the hot melt units 14, 114, 214. First, the cables providing the gun actuation signals to the at least one dispenser gun 18 may be run along the same path or within the hose(s) 16 that delivers hot melt adhesive to the dispenser gun(s) 18. This reduces the number of hoses/cables/etc. hanging from each dispenser gun 18 and extending in different directions, thereby reducing the gun envelope, improving the aesthetics of the system, and improving the robustness of the connections made with each dispenser gun 18. Second, the termination of the gun actuation signals within the hot melt units 14, 114, 214 provides access to information that may be used to run diagnostics on the components of each dispenser gun 18 and components of the dispensing system 10, 110, 210 as a whole. These diagnostics can improve the information delivered to the end user or a technician, such that the dispensing system 10, 110, 210 tends to maintain itself in an operational state with minimized downtime. The end user can therefore know more about how the dispensing system 10, 110, 210 is operating and anticipate faults or errors that can be addressed during regularly scheduled facility shutdowns or downtimes. Thus, the dispensing systems 10, 110, 210 are advantageous compared to conventional designs.

While the present invention has been illustrated by a description of several embodiments, and while such embodiments have been described in considerable detail, there is no intention to restrict, or in any way limit, the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. An adhesive dispensing system, comprising:
   a dispenser gun configured to dispense adhesive onto a substrate;
   a hot melt unit configured to heat adhesive and pump adhesive to the dispenser gun, the hot melt unit including a melter control system controlling operation of the hot melt unit;
   a monitoring device included in the melter control system, the monitoring device being located at the hot melt unit; and
   a source of gun actuation that is separate from the monitoring device, the source of gun actuation configured to send gun actuation signals to operate the dispenser gun, the gun actuation signals being sent to the monitoring device and then from the monitoring device to the dispenser gun such that the melter control system monitors the gun actuation signals and collects information regarding actuations of the dispenser gun based on the monitored gun actuation signals.

2. The dispensing system of claim 1, wherein the melter control system is configured to operate a plurality of diagnostic processes based on the monitored gun actuation signals, to thereby monitor operation of the dispenser gun and operation of the dispensing system as a whole.

3. The dispensing system of claim 2, wherein the plurality of diagnostic processes includes one or more of the following: monitoring life cycles of components of the dispenser gun; enabling a standby state during long periods without actuation of the dispenser gun; adjusting fluid pressure delivered by the hot melt unit based on line speed at the dispenser gun; comparing actuation parameters of the hot melt unit and the dispenser gun to identify error states; or shifting a reversal of a piston pump within the hot melt unit to avoid pump wink at the dispenser gun.

4. The dispensing system of claim 1, further comprising:
   a hose connected to the hot melt unit and to the dispenser gun, the hose delivering adhesive from the hot melt unit to the dispenser gun; and
   a cable connected to the hot melt unit and the dispenser gun, the cable delivering the gun actuation signals from the hot melt unit to the dispenser gun, the cable positioned alongside or coupled to the hose such that the size of a gun envelope defined by the dispenser gun and wire connections to other components is minimized.

5. The dispensing system of claim 4, wherein the cable is positioned within the hose.

6. The dispensing system of claim 1, wherein the source of gun actuation is positioned within the hot melt unit.

7. The dispensing system of claim 1, wherein the source of gun actuation is positioned outside the hot melt unit.

8. The dispensing system of claim 1, wherein the monitoring device includes a terminal block located in the hot melt unit, wherein the source of gun actuation is connected to the terminal block and the terminal block is connected to the dispenser gun such that the gun actuation signals are terminated within the hot melt unit, the melter control system monitoring the gun actuation signals at the terminal block.

9. The dispensing system of claim 8, wherein the melter control system operates to selectively control the gun actuation signals by determining whether gun actuation signals are passed through the terminal block to the dispenser gun.

10. The dispensing system of claim 9, wherein the melter control system selectively controls the gun actuation signals to avoid error states in which the dispenser gun should not be actuated.

11. The dispensing system of claim 8, further comprising:
an inline signal control device connected to the terminal block and the dispenser gun, the inline signal control device configured to control or modify the gun actuation signals passed through the terminal block.

12. A method of operating an adhesive dispensing system including a dispenser gun and a hot melt unit having a melter control system with a monitoring device, the method comprising:
pumping heated adhesive to the dispenser gun from the hot melt unit;
sending gun actuation signals from a source of gun actuation to the monitoring device of the melter control system, the monitoring device located at the hot melt unit and being separate from the source of gun actuation, and then from the monitoring device to the dispenser gun to cause the dispenser gun to dispense adhesive onto a substrate;
monitoring the gun actuation signals at the melter control system; and
collecting information regarding actuations of the dispenser gun based on the monitored gun actuation signals.

13. The method of claim 12, further comprising:
performing one or more diagnostic processes pertaining to the dispenser gun and the dispensing system as a whole based on the monitored gun actuation signals.

14. The method of claim 13, wherein performing one of the diagnostic processes further comprises:
monitoring a total actuation count for components of the dispenser gun; and
providing an indication that one of the components will require repair or replacement after the component has reached a predetermined percentage of a predicted total life cycle.

15. The method of claim 13, wherein performing one of the diagnostic processes further comprises:
comparing operational parameters of the hot melt unit to operational parameters of the dispenser gun; and
identifying error states or potential fault conditions based on the comparison of parameters.

16. The method of claim 13, wherein performing one of the diagnostic processes further comprises:
detecting a length of time since the most recent actuation of the dispenser gun; and
actuating a standby state automatically in which the adhesive is cooled if the length of time since the most recent actuation exceeds a predetermined threshold.

17. The method of claim 13, wherein performing one of the diagnostic processes further comprises:
monitoring the current drawn by a solenoid of the dispenser gun; and
comparing the current drawn by the solenoid to a known current waveform that should be present at the solenoid to detect faults or precursors to faults of the solenoid.

18. The method of claim 13, wherein performing one of the diagnostic processes further comprises:
monitoring the actuation cycles of the dispenser gun; and
shifting reversal of a piston pump in the hot melt unit so that the reversal and any associated reduced adhesive flow occurs when the dispenser gun is not active.

19. The method of claim 12, wherein the heated adhesive is pumped through a hose connected to the hot melt unit and the dispenser gun, and sending gun actuation signals further comprises:
sending the gun actuation signals from the hot melt unit to the dispenser gun through a cable connected to the hose.

20. The method of claim 19, wherein sending the gun actuation signals further comprises:
sending the gun actuation signals from the hot melt unit to the dispenser gun through the cable which is located within the hose.

21. A method of operating an adhesive dispensing system including a dispenser gun and a hot melt unit having a melter control system, the method comprising:
pumping heated adhesive to the dispenser gun from the hot melt unit;
sending gun actuation signals from a source of gun actuation to the melter control system and then to the dispenser gun to cause the dispenser gun to dispense adhesive onto a substrate;
monitoring the gun actuation signals at the melter control system;
collecting information regarding actuations of the dispenser gun based on the monitored gun actuation signals; and
terminating the gun actuation signals at a connecting device including a terminal block within the hot melt unit.

22. The method of claim 21, further comprising:
selectively controlling the gun actuation signals by determining whether gun actuation signals are passed through the terminal block to the dispenser gun.

23. The method of claim 22, further comprising:
controlling the gun actuation signals further with an inline signal control device connected to the terminal block and the dispenser gun.

24. A method of operating an adhesive dispensing system, the method comprising:
dispensing an adhesive;
sensing the operation of a component of the adhesive dispensing system;
determining whether the component requires service in response to the sensing; and
indicating a need for service when it is determined that the component requires service,
wherein determining whether the component requires service further comprises:
accumulating and storing data associated with the sensed operation of the component; and
comparing the accumulated and stored data to reference data associated with a life of the component.

25. The method of claim 24, wherein indicating a need for service further comprises at least one of:
a) actuating a visual indication on a control unit;
b) sending a communication to a serviceman; and
c) ordering a new component from a vendor.

26. The method of claim 25, wherein the adhesive dispensing system includes an adhesive dispensing gun, a hose, and a pump, and sensing the operation of the component further comprises at least one of:
   a) sensing the actuation of the adhesive dispensing gun;
   b) sensing the heating of the hose; and
   c) sensing the operation of the pump.

27. The method of claim 24, further comprising:
   adjusting the reference data to account for characteristics that affect component life.

28. The method of claim 27, wherein the characteristics that affect component life include at least one of:
   a) the adhesive that is dispensed;
   b) an application temperature for the adhesive;
   c) a viscosity of the adhesive; and
   d) abrasion qualities of the adhesive.

29. A method of operating an adhesive dispensing system, the method comprising:
   dispensing an adhesive;
   sensing the operation of a component of the adhesive dispensing system;
   determining whether the component requires service in response to the sensing; and
   indicating a need for service when it is determined that the component requires service,
   wherein sensing the operation of the component further comprises:
   determining a total number of cycles of operation performed with a dispensing module; and
   wherein determining whether the component requires service further comprises:
   determining a rate of use of the dispensing module;
   comparing the total number of cycles of operation of the dispensing module to reference data indicative of predicted cycle life; and
   determining a predicted remaining life of the dispensing module based on the comparing step and the rate of use of the dispensing module.

30. The method of claim 29, further comprising:
   automatically ordering a new dispensing module when the predicted remaining life is less than a predetermined set point.

31. The method of claim 30, further comprising:
   scheduling a down time for servicing of the adhesive dispensing system by replacing the dispensing module.

32. The method of claim 31, further comprising:
   determining if other components of the adhesive dispensing system require replacement; and
   coordinating servicing of the other components during the down time.

33. The method of claim 29, further comprising:
   adjusting the reference data to account for characteristics that affect component life.

34. The method of claim 33, wherein the characteristics that affect component life include at least one of:
   a) the adhesive that is dispensed;
   b) an application temperature for the adhesive;
   c) a viscosity of the adhesive; and
   d) abrasion qualities of the adhesive.

35. The method of claim 21, further comprising:
   performing one or more diagnostic processes pertaining to the dispenser gun and the dispensing system as a whole based on the monitored gun actuation signals.

36. The method of claim 35, wherein performing one of the diagnostic processes further comprises:
   monitoring a total actuation count for components of the dispenser gun; and
   providing an indication that one of the components will require repair or replacement after the component has reached a predetermined percentage of a predicted total life cycle.

37. The method of claim 35, wherein performing one of the diagnostic processes further comprises:
   comparing operational parameters of the hot melt unit to operational parameters of the dispenser gun; and
   identifying error states or potential fault conditions based on the comparison of parameters.

38. The method of claim 35, wherein performing one of the diagnostic processes further comprises:
   detecting a length of time since the most recent actuation of the dispenser gun; and
   actuating a standby state automatically in which the adhesive is cooled if the length of time since the most recent actuation exceeds a predetermined threshold.

39. The method of claim 35, wherein performing one of the diagnostic processes further comprises:
   monitoring the current drawn by a solenoid of the dispenser gun; and
   comparing the current drawn by the solenoid to a known current waveform that should be present at the solenoid to detect faults or precursors to faults of the solenoid.

40. The method of claim 35, wherein performing one of the diagnostic processes further comprises:
   monitoring the actuation cycles of the dispenser gun; and
   shifting reversal of a piston pump in the hot melt unit so that the reversal and any associated reduced adhesive flow occurs when the dispenser gun is not active.

* * * * *